United States Patent [19]

Mitsui et al.

[11] Patent Number: 5,437,938
[45] Date of Patent: Aug. 1, 1995

[54] BATTERY PACK

[75] Inventors: Hidero Mitsui, Kanagawa; Yoshihiro Ide, Tokyo, both of Japan

[73] Assignee: Sony Corporation, Japan

[21] Appl. No.: 290,077

[22] Filed: Aug. 12, 1994

Related U.S. Application Data

[63] Continuation of Ser. No. 22,562, Feb. 25, 1993, abandoned.

[30] Foreign Application Priority Data

Mar. 6, 1992 [JP] Japan .................................. 4-050004

[51] Int. Cl.$^6$ ........................................... H01M 2/10
[52] U.S. Cl. .......................................... 429/1; 429/96; 429/123; 429/178
[58] Field of Search ........................ 429/1, 96, 99, 123, 429/178, 179, 180

[56] References Cited

U.S. PATENT DOCUMENTS

| | | | |
|---|---|---|---|
| 2,225,460 | 12/1940 | Porth | 429/123 |
| 2,266,686 | 12/1941 | Emanuel | 429/178 X |
| 3,667,026 | 5/1972 | Bogut et al. | |
| 3,917,990 | 11/1975 | Sherman, Jr. | |
| 4,006,396 | 2/1977 | Bogut | |
| 4,123,598 | 10/1978 | Hammel | 429/178 X |
| 4,315,364 | 2/1982 | Leffingwell | |
| 4,329,406 | 5/1982 | Dahl et al. | |
| 4,468,605 | 8/1984 | Fitzgerald et al. | |
| 4,530,034 | 7/1985 | Karawada | 429/123 X |
| 4,576,880 | 3/1986 | Verdier et al. | |
| 4,637,965 | 1/1987 | Davis | 429/179 X |
| 4,737,420 | 4/1988 | Ikeda et al. | 429/1 |
| 4,943,498 | 7/1990 | Cooper et al. | 429/97 |
| 4,969,206 | 11/1990 | Desrochers | 455/89 |
| 4,997,731 | 3/1991 | Machida et al. | |
| 5,057,383 | 10/1991 | Sokira | 429/92 |
| 5,111,128 | 5/1992 | Branan, Jr. et al. | 320/2 |
| 5,183,714 | 2/1993 | Mitsui et al. | 429/123 |
| 5,200,686 | 4/1993 | Lee | 320/2 |
| 5,208,116 | 5/1993 | Joh | 429/96 |
| 5,227,262 | 7/1993 | Ozer | 429/98 |
| 5,248,927 | 9/1993 | Takei et al. | 320/2 |

FOREIGN PATENT DOCUMENTS

| | | |
|---|---|---|
| 0480706 | 4/1992 | European Pat. Off. |
| 0549950 | 7/1993 | European Pat. Off. |
| 0572327 | 12/1993 | European Pat. Off. |
| 9112374 | 2/1992 | Germany |
| 59-167098 | 9/1984 | Japan |
| 63-259961 | 10/1988 | Japan |
| 1-243370 | 9/1989 | Japan |
| 1487604 | 10/1977 | United Kingdom |
| 9211679 | 7/1992 | WIPO |

OTHER PUBLICATIONS

European Search Report, Sep. 9, 1993.
European Search Report, Dec. 20, 1993.
Sony Rechargeable Battery Pack, NP-55/55H/66/66H77/77H Instruction Sheet (Date Unknown).
Sony Rechargeable Battery Pack, NP-60D Instruction Sheet (Date Unknown).

*Primary Examiner*—Stephen Kalafut
*Attorney, Agent, or Firm*—Ronald P. Kananen

[57] ABSTRACT

A battery pack having rechargeable secondary batteries housed in a battery casing. The battery pack includes hollow tubular-shaped anodic and cathodic terminals in a right upper void and in a left upper void, respectively, of the battery casing. The voids are produced by housing the cylindrical first and second secondary batteries in the battery casing. An anodic terminal connecting pin and a cathodic terminal connecting pin are provided on an external equipment for fitting in and connecting with the anodic terminal and the cathodic terminal, respectively. Since there is no necessity for providing a particular mounting space for the anodic and cathodic terminals, the battery pack may be reduced in size, while the battery pack may be reliably supported with respect to the external equipment in a manner free from wobbling or detachment from the external equipment.

33 Claims, 3 Drawing Sheets

BATTERY PACK

This application is a continuation of application Ser. No. 08/022,562 filed Feb. 25, 1993 now abandoned.

BACKGROUND OF THE INVENTION

1. Field of the Invention

This invention relates to a battery pack having a rechargeable secondary battery housed within a battery casing. More particularly, it relates to a battery pack employed for supplying power to portable electronic equipment, such as a portable video camera unit.

2. Description of the Related Art

There is extensively employed a so-called handy-type video camera unit which is able to record moving pictures easily on, for example, an eight mm wide video tape. Since this handy type video camera is lightweight, small-sized and can be transported easily, a battery pack having a so-called secondary battery housed therein is typically used as a power source.

A conventional battery pack, as shown for example in FIG. 1, is made up of a substantially rectangular battery casing 50, first to fifth rechargeable secondary batteries 51a to 51e accommodated in the battery casing 50, an anodic plate 52 connected to an anode of the first secondary battery 51a for use as an anode terminal, and a cathodic plate 53 connected to the cathode of the fifth secondary battery 51e for use as a cathode terminal.

The battery casing 50 has a substantially planar junction surface 50a by which the battery casing is to be connected to a power supply surface of a video camera unit or a charger. On the junction surface 50a are formed a cavity for anodic terminal 54 and a cavity for cathodic terminal 55 at a predetermined interval from each other. Within these cavities 54 and 55, which are preferably elliptical in shape, the anodic plate 52 and the cathodic plate 53 are provided for closing them from the back side of the junction surface 50a.

The first to fifth secondary batteries 51a to 51e are substantially cylindrical in shape and are each of a length slightly shorter than the transverse width of the battery casing 50. The secondary batteries 51a to 51e are transversely arrayed in the battery casing 50 so that the anodes and the cathodes are alternately directed in the opposite directions, as shown by broken lines in FIG. 1. Within the battery casing 50, the first secondary battery 51a has its cathode connected to the anode of the second secondary battery 51b by a connecting plate (not shown), the second secondary battery 51b has its cathode connected to the anode of the third secondary battery 51c by a connecting plate 56, the third secondary battery 51c has its cathode connected to the anode of the fourth secondary battery 51d by a connecting plate (not shown), and the fourth secondary battery 51d has its cathode connected to the anode of the fifth secondary battery 51e by a connecting plate 57. That is, the first to fifth secondary batteries 51a to 51e are connected in series with one another so that the anode of the first secondary battery 51a is connected to the anodic plate 52 and the cathode of the fifth secondary battery 51e is connected to the cathodic plate 53.

Meanwhile, the upper surface 50b of the battery casing 50 opposite to the junction surface 50a has its four corners 50c rounded to facilitate handling because these corners are caused to abut on the palm of the hand of the user when connecting the battery pack to the power supply surface of the video camera unit or the charger.

The power supply surface of the video camera unit or the charger is provided with an anode contacting pin and a cathode contacting pin which are contacted at their upper ends with the anodic plate 52 and the cathodic plate 53, respectively, when the power supply surface is connected to the junction surface 50a of the battery pack.

During charging, there are stored in the battery pack the electrical energies supplied from the charger by way of the anode contacting pin, cathode contacting pin, anodic plate 52 and the cathodic plate 53 in this order. Conversely, during discharging, the electrical energies stored in the battery pack by charging are supplied to the video camera unit by way of the anodic plate 52, cathodic plate 53, anode contacting pin and the cathode contacting pin in this order.

With the above-described battery pack, since the special mounting space is provided in the junction surface 50a for the anodic terminal and the cathodic terminal, that is, the anodic plate 52 and the cathodic plate 53, the battery pack itself is increased in size in an amount corresponding to the mounting space for the anodic and cathodic terminals to retrogress from the goal of reducing the size of the video camera unit.

On the other hand, since the anodic terminal and the cathodic terminal are plate-shaped and contacted by the upper ends of the anodic contact pin and the cathodic contact pin provided on the charger or on the video camera unit for charging or discharging electrical energies, the anodic contact pin or the cathodic contact pin cannot be contacted reliably with the anodic terminal or with the cathodic terminal, respectively, thus leading to contact troubles. Besides, since the plate-shaped surface is contacted with the contact pins, the battery pack cannot be supported reliably by the charger or by the video camera unit, thus leading to wobbling of the battery pack during use or to the battery pack being detached from the charger or from the video camera unit.

OBJECTS AND SUMMARY OF THE INVENTION

In view of the above-described status of the art, it is an object of the present invention to provide a battery pack in which the anodic terminal and the cathodic terminal can be mounted without providing a special mounting space and the anodic terminal or the cathodic terminal can be contacted reliably with connecting pins of the charger or the electronic equipment, such as a video camera unit, and which is free from the risk of wobbling or detached from the equipment when in use.

According to the present invention, there is provided a battery pack having a re-chargeable secondary battery housed within a battery casing, comprising a substantially tubular-shaped anodic terminal, a substantially tubular-shaped cathodic terminal, said secondary battery being adapted for storing electrical energies supplied thereto via said anodic terminal and said cathodic terminal and for outputting the stored electrical energies via said anodic terminal and said cathodic terminal, and a battery casing for housing the secondary battery therein, said substantially tubular-shaped anodic and cathodic terminals being provided in voids produced on housing said secondary battery in said battery casing.

With the present battery pack, by providing the substantially tubular-shaped anodic and cathodic terminals in the voids produced on housing the secondary batteries in the battery casing, the mounting space for the anodic and cathodic terminals may be diminished. Furthermore, the substantially tubular-shaped anodic and cathodic terminals of the battery casing may be connected reliably to the connecting pins of the equipment, such as the video camera unit, for assuring a positive support of the battery pack by the external equipment.

Other objects and advantages of the present invention will become apparent from the following description of the preferred embodiment and the claims.

DETAILED DESCRIPTION OF THE PREFERRED EMBODIMENT

Figure 1:
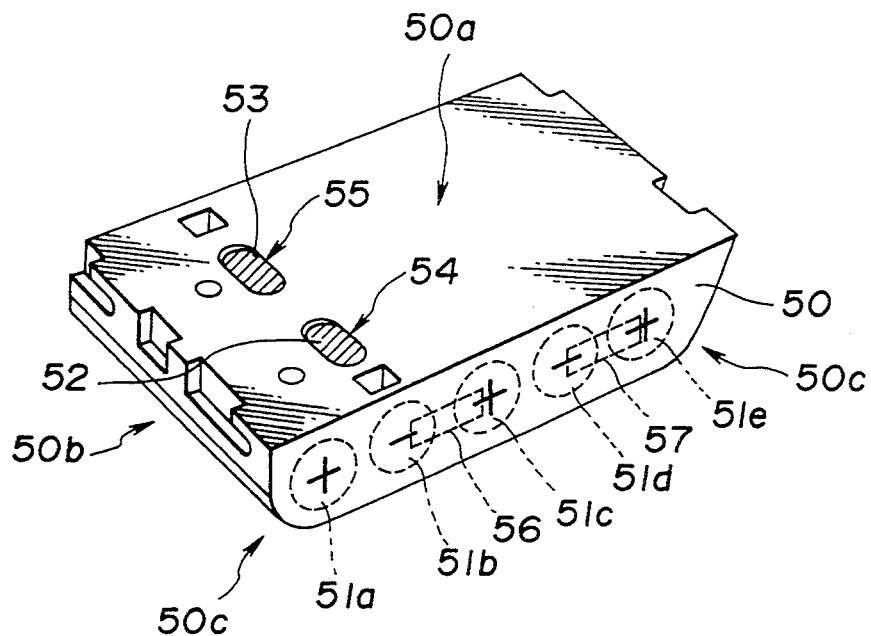
FIG. 1 is a perspective view showing a conventional battery pack.

Referring to the drawings, a battery pack according to a preferred embodiment of the present invention will be explained in detail.

The battery pack according to the present invention comprises a substantially rectangular battery casing 1, first and second rechargeable secondary batteries 2, 3 accommodated in the battery casing 1, an anodic terminal 4 connected to an anode 2a of the first secondary battery 2, and a cathodic terminal 5 connected to a cathode 3b of the second secondary battery 3.

The first and second secondary batteries 2, 3 are cylindrical-shaped and are each of a length slightly shorter than the length of the battery casing 1. On the other hand, the combined length of the diameter of the first secondary battery 2 and the diameter of the second secondary battery 3 is slightly shorter than the transverse width of the battery casing 1, while the diameter of each of the first and second secondary batteries 2, 3 is slightly lower than the height of the battery casing 1. Consequently, the first and second batteries 2, 3 are accommodated in the battery casing 1 with a certain looseness. Meanwhile, the first and second secondary batteries 2, 3 are accommodated in the battery casing 1 so that the anode 2a of the first secondary battery 2 and the cathode 3a of the second secondary battery 3 face the front side 1c of the battery casing 1. In this state, the cathode 2b of the first secondary battery 2 and the anode 3a of the second secondary battery 3 are connected to each other by a connecting plate (not shown). That is, the first secondary battery 2 and the second secondary battery 3 are connected in series with each other. Also, the batteries 2, 3 are contacted side to side when accommodated in the battery casing 1.

Since the batteries 2, 3 are contacted side to side when accommodated in the substantially rectangular battery casing 1, as described above, a first central gap 8 is defined on an upper surface 1a of the battery casing 1. By taking advantage of the first central gap 8, a guide groove 6 having a rectangular transverse cross-section is defined beginning from the mid part of the front side 1c and extending along the overall length of the battery casing 1 to the midpart of the rear side 1d. Similarly, a second central gap 9 is defined on a lower surface 1b of the battery casing 1 as a result of the batteries 2, 3 being contacted side to side. By taking advantage of the second central gap 9, an inverted insertion inhibiting groove 7 having a trapezoidal transverse cross-section is defined beginning from the mid part of the front side 1c and extending for a length equal to about two-thirds of the length of the guide groove 6.

Figure 3:
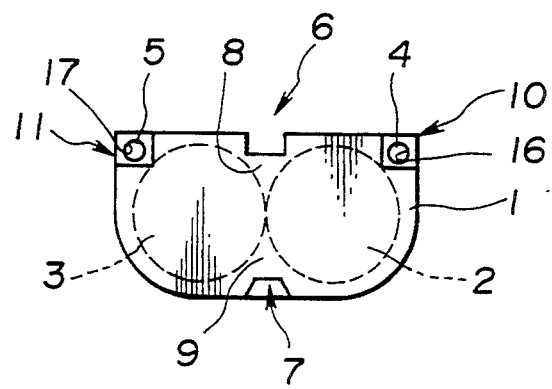
FIG. 3 is a front view showing the battery pack shown in FIG. 2.

The lower surface 1b of the battery pack 1 has its corners rounded for ease of handling. Consequently, the battery casing 1 has the shape of a barrel roof, when viewed from the front side 1c, as shown in FIG. 3.

The anodic terminal 4 is cylindrical-shaped and connected to the anode 2a of the first secondary battery 2, while the cathodic terminal 5 is similarly cylindrical-shaped and connected to the cathode 3b of the second secondary battery 3.

Figure 2:
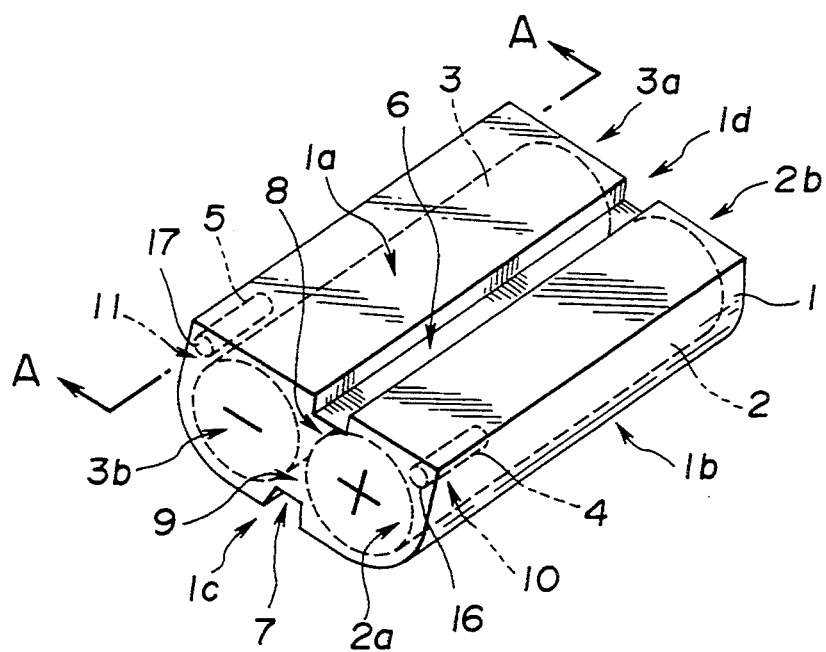
FIG. 2 is a perspective view showing a battery pack embodying the present invention.

When the first and second secondary batteries 2, 3 are housed within the battery casing 1, since the battery casing is barrel roof shaped, a right upper void 10 is defined between the first secondary battery 2 and the right upper corner of the battery casing 1 as viewed from the front side 1c. As shown in FIGS. 2 and 3, this right upper void is formed between a flat portion 32 and a curved portion 34 of the battery casing 1. A left upper void 11 is defined between the second secondary battery and the left upper corner of the battery casing 1 as viewed from the front side 1c. This left upper void 11 is similarly formed between the flat portion 32 and the curved portion 34 of the battery casing 1. An anode insertion hole 16 and a cathode insertion hole 17, slightly larger in diameter than and approximately equal in length to the anodic terminal 4 and the cathodic terminal 5, respectively, are provided in the right upper gap 10 and in the left upper gap 11 in parallel relationship to the first secondary battery 2 and the second secondary battery 3, respectively. The anodic terminal 4 and the cathodic terminal 5 are inserted into the anode insertion hole 16 and into the cathode insertion hole 17, respectively.

Meanwhile, the battery casing 1 is molded, along with the anode insertion hole 16 and the cathode insertion hole 17, from an insulating material, so that, by inserting the anodic terminal 4 and the cathodic terminal 5 into the anode insertion hole 16 and into the cathode insertion hole 17, respectively, it becomes possible to prevent short-circuiting which might occur due to the anodic terminal 4 and the cathodic terminal 5 being contacted with the first secondary battery 2 and the second secondary battery 3, respectively.

By providing the hollow cylindrical-shaped anodic and cathodic terminals 4 and 5 in the right upper void 10 and in the left upper void 11, respectively, which are produced as a result of the first and second secondary batteries 2, 3 being accommodated within the battery casing 1, it is no longer necessary to provide a particular mounting site for mounting the anodic terminal 4 or the cathodic terminal 5, thus enabling the battery pack to be reduced in size and contributing to reduction in size of the charger or the electronic equipment, such as a video camera unit, which is to be connected to the battery pack.

Figure 6:
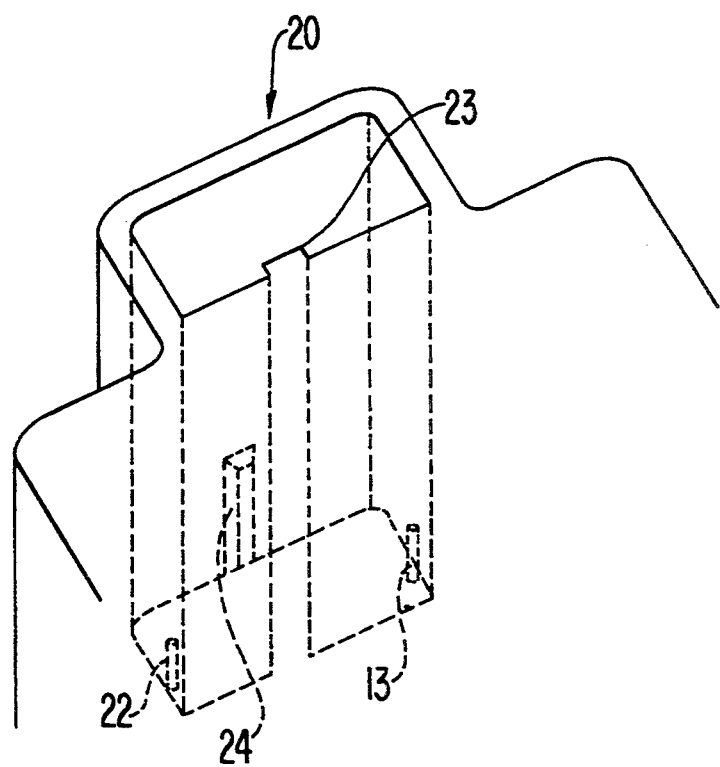
FIG. 6 is an illustration of a battery pack housing section, according to the present invention, on a video camera unit.

The video camera unit, for example, as shown in FIG. 6, to which the battery pack having such cylindrical-shaped anodic and cathodic terminals 4, 5 is connected, may be of an external attachment type in which the battery pack is attached to the outer side of the video camera unit. However, by providing a battery pack housing section 20 within the video camera unit, and by housing the battery pack within the battery pack housing section for establishing electrical connection, in accordance with an internal mounting system, the anodic terminal 4 and the cathodic terminal 5 may be connected more reliably to the connecting pins 13 and 22, while the battery pack may be supported more reliably by the unit.

If the internal mounting system is adopted, as in the case of the external attachment system, an anode connecting pin 13 and a cathode connecting pin 22, each having a diameter slightly smaller than the inside diameter of the anodic terminal 4 and the cathodic terminal 5 respectively, and adapted for being engaged with the anodic terminal 4 and the cathodic terminal 5, respectively, are protuberantly formed at a terminal end of the battery pack housing section provided in the video camera unit at an interval corresponding to the interval by which the anodic terminal 4 and the cathodic terminal 5 are provided on the battery casing 1. The distal ends of the anodic connecting pin 13 and the cathodic connecting pin 22 are tapered for ease of insertion into the anodic terminal 4 and into the cathodic terminal 5, respectively.

At an inserting end of the battery pack housing section are formed a first protrusion of a rectangular transverse cross-section 23 and a second protrusion of a trapezoidal transverse cross-section 24. The first and second protrusions are provided for being engaged with the guide groove 6 of the upper surface 1a of the battery casing 1 and the inverted insertion inhibiting groove 7 of the lower surface 1b of the battery casing 1, respectively, when the battery casing 1 is introduced into the battery casing housing section 20.

The inverted insertion inhibiting groove 7 of the battery casing 1 is trapezoidal in transverse cross-section, and the second protrusion 24 provided at the inserting end of the battery pack housing section of the video camera unit is also trapezoidal in transverse cross-section, so that, if it is attempted to introduce the battery pack in an upside-down position into the battery pack housing section 20, the inverted insertion inhibiting groove 7 and the second protrusion cannot be fitted, so that insertion cannot be achieved. On the other hand, if it is attempted to introduce the battery pack with the rear side first, since the inverted insertion inhibiting groove 7 is not formed throughout the entire length of the battery casing 1, the second protrusion is engaged with the back side 1d of the battery casing 1, so that insertion similarly cannot be achieved. In this manner, by providing the inverted insertion inhibiting groove of the trapezoidal transverse cross-section having the length shorter than the overall length of the battery casing 1 from the front side 1c of the battery casing 1, insertion of the battery pack in the upside down position or with the rear side of the battery pack first can be prevented.

Figure 4:
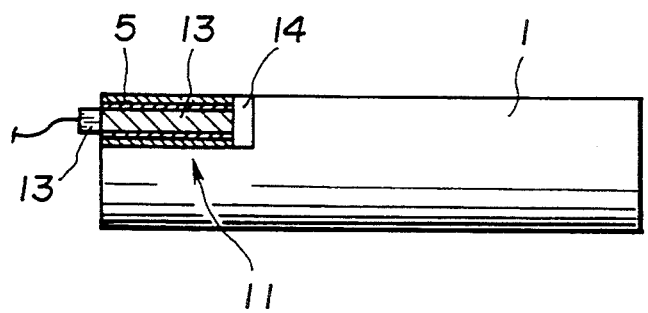
FIG. 4 is a longitudinal cross-sectional side view, taken along line A—A of FIG. 2, showing the battery pack.

If the battery pack is introduced in the correct vertical position and in the correct fore-and-aft position into the battery pack housing section, the guide groove 6 of the rectangular transverse cross-section is engaged by the first protrusion of the rectangular transverse cross-section which is provided at the entrance to the battery pack housing section of the electronic equipment, such as a video camera unit, so that the battery pack is guided by the guide groove 6 into the battery pack housing section. Thus, as shown in FIG.4 which is the longitudinal cross-section along line BO of FIG. 2, the anodic connecting pin 13 provided at the terminal part of the battery pack housing section is connected to the cathodic terminal 5 of the battery pack 1, while the anodic connecting pin is inserted into and connected to the anodic terminal 4, in a manner not shown.

Since the anodic connecting pin and the cathodic connecting pin 13 are fitted and connected to the anodic terminal 4 and to the cathodic terminal 5, respectively, the battery pack may be supported reliably by the anodic connecting pin and the cathodic connecting pin. Consequently, when the battery pack is inserted into the battery pack housing section for electrical connection at the anode and the cathode, the battery pack may be prevented from being wobbled or detached from the video camera unit.

Figure 5:
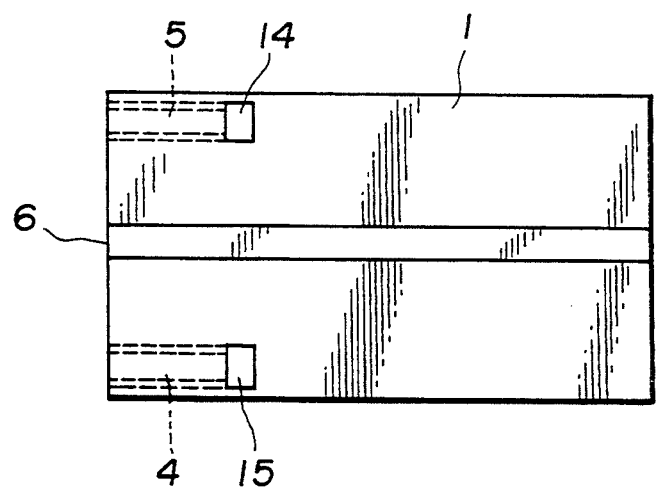
FIG. 5 is a plan view showing the battery pack shown in FIG. 2.

Meanwhile, since the anodic terminal 4 and the cathodic terminal 5, provided in the battery pack, are cylindrical-shaped, and hence hollow, the hollow part tends to be clogged with foreign matter, such as dust. If the above-described connection is made with the foreign matter clogged in the hollow part, the foreign matter is forced into the terminals 4 and 5 by the connecting pins and may cause contact troubles. For this reason, dust eliminating holes 14, 15 are provided through the anodic terminal 4 and the cathodic terminal 5, respectively, as shown in FIGS. 4 and 5. Thus, the dust clogged in the anodic terminal 4 and in the cathodic terminal 5 is extruded via the elimination holes 14, 15 by the connecting pins to maintain the anodic terminal 4 and the cathodic terminal 5 clean at all times to prevent the contact troubles.

It is seen from the above description that the present invention provides a battery pack in which the cylindrical-shaped anodic and cathodic terminals 4 and 5 are mounted in the right upper void 10 and in the left upper void 11 produced by housing the first and second secondary batteries 2, 3 in the battery casing 1, so that there is no necessity of providing a particular mounting space for the anodic terminal 4 or the cathodic terminal 5. This arrangement renders it possible to reduce the size of the battery pack to contribute to reduction in size of the charger or the video camera unit.

On the other hand, since the anodic terminal 4 and the cathodic terminal 5 are fitted and connected to the anodic connecting pin and to the cathodic connecting pin provided in the equipment, respectively, the battery pack can be supported reliably by the anodic and cathodic connecting pins to eliminate wobbling or detachment of the battery pack.

Although first and second secondary batteries are housed within the battery casing 1 in the above-described embodiment, one or three or more of the secondary batteries may be accommodated in the battery casing 1 without departing from the scope of the present invention. Furthermore, although the anodic and cathodic terminals are cylindrical in shape in the above-described embodiment, the anodic and cathodic terminals may be of any other shape, such as a polygon or an ellipse.

What is claimed is:

1. A battery pack for providing electrical energy to an external device comprising:

a battery casing for containing at least one rechargeable secondary battery, said battery casing having a front side portion, a rear side portion, and a flat portion connected to a curved portion whereby a first void and a second void are formed respectively within said battery casing within spaces defined by said front side portion, said rear side portion, said flat portion, said curved portion, and sides of said at least one rechargeable battery;

a first terminal coupled to the anode of said at least one rechargeable battery, said first terminal being located in said first void, said first terminal having a central axis which is disposed parallel to the longitudinal direction of said at least one rechargeable battery; and a second terminal coupled to the cathode of said at least one rechargeable battery, said second terminal being located in said second void, said second terminal having a central axis which is disposed parallel to the longitudinal direction of said at least one rechargeable battery.

2. The battery pack of claim 1 wherein said at least one rechargeable battery comprises two cylinder-shaped rechargeable batteries electrically coupled in series, said two cylinder-shaped rechargeable batteries being physically disposed parallel to one another in said battery casing.

3. The battery pack of claim 2 wherein said battery casing has a guide groove formed in said flat portion which forms a recess in said battery casing between said two cylinder-shaped rechargeable batteries.

4. The battery pack of claim 3 wherein said battery pack attaches to said external device with said guide groove.

5. The battery pack of claim 3 wherein said guide groove extends the entire length of said flat portion between said front side portion and said rear side portion.

6. The battery pack of claim 3 wherein said battery casing has an insertion inhibiting groove formed in said curved portion which forms a recess in said battery casing between said two cylinder-shaped rechargeable batteries.

7. The battery pack of claim 6 wherein said insertion inhibiting groove extends from said front side portion to a midpart of said curved portion.

8. The battery pack of claim 1 wherein said first terminal and said second terminal are tubular-shaped.

9. The battery pack of claim 1 wherein said first tubular-shaped terminal is fixedly disposed in a first tubular-shaped recess of said battery casing in said first void and said second tubular-shaped terminal is fixedly disposed in a second tubular-shaped recess of said battery casing in said second void.

10. The battery pack of claim 9 wherein said external device includes a first pin and a second pin for electrically coupling said external device with said battery pack, said first pin and said second pin being inserted respectively into said first tubular-shaped terminal and said second tubular-shaped terminal.

11. The battery pack of claim 10 wherein said first tubular-shaped recess and said second tubular-shaped recess each have dust eliminating holes formed therein through said flat portion of said battery casing.

12. A battery pack for providing electrical energy to an external device comprising:

a battery casing for containing at least one rechargeable secondary battery, said battery casing having a front side portion, a rear side portion, and a flat portion connected to a curved portion whereby a first void and a second void are formed respectively within said battery casing within spaces defined by said front side portion, said rear side portion, said flat portion, said curved portion, and sides of said at least one cylinder-shaped rechargeable battery;

a first tubular-shaped terminal coupled to the anode of said at least one rechargeable battery, said first tubular-shaped terminal being located in said first void, said first tubular-shaped terminal having a central axis which is disposed parallel to the longitudinal direction of said at least one rechargeable battery; and a second tubular-shaped terminal coupled to the cathode of said at least one rechargeable battery, said second tubular-shaped terminal being located in said second void, said second tubular-shaped terminal having a central axis which is disposed parallel to the longitudinal direction of said at least one rechargeable battery;

wherein said flat portion of said battery casing has dust eliminating holes formed thereon, said dust eliminating holes providing a passage though which dust is expelled from said first tubular-shaped terminal and said second tubular-shaped terminal.

13. The battery pack according to claim 1, wherein said external device is a video camera.

14. A battery pack for providing electrical energy to an external device comprising:

a battery casing for containing at least one secondary battery, said battery casing having a front side portion, a rear side portion, a bottom portion which is placed in contact with said external device, and a top portion having a surface which substantially corresponds in shape with the shape of said secondary battery, whereby a first void and a second void are formed respectively within said battery casing within spaces defined by said front side portion, said rear side portion, said bottom portion, said top portion, and sides of said at least one secondary battery;

a first terminal coupled to the anode of said at least one secondary battery, said first terminal being located in said first void, said first terminal having a central axis which is disposed in a direction substantially parallel to the longitudinal direction of said at least one secondary battery; and a second terminal coupled to the cathode of said at least one secondary battery, said second terminal being located in said second void, said second terminal having a central axis which is disposed in a direction substantially parallel to the longitudinal direction of said at least one secondary battery.

15. The battery pack of claim 14, wherein said at least one secondary battery comprises two cylinder-shaped rechargeable batteries electrically coupled in series, said two cylinder-shaped rechargeable batteries being physically disposed parallel to one another in said battery casing.

16. The battery pack of claim 15, wherein said battery casing has a guide groove formed in said bottom portion which forms a recess in said battery casing between said two cylinder-shaped rechargeable batteries.

17. The battery pack of claim 16, wherein said battery pack attaches to said external device with said guide groove.

18. The battery pack of claim 16, wherein said battery casing has an insertion inhibiting groove formed in said top portion which forms a recess in said battery casing between said two cylinder-shaped rechargeable batteries.

19. The battery pack of claim 14, wherein said first terminal and said second terminal are tubular-shaped; and
   wherein said first tubular-shaped terminal is fixedly disposed in a first tubular-shaped recess of said battery casing in said first void and said second tubular-shaped terminal is fixedly disposed in a second tubular-shaped recess of said battery casing in said second void.

20. The battery pack of claim 19, wherein said external device includes a first pin and a second pin for electrically coupling said external device with said battery pack, said first pin and said second pin being inserted respectively into said first tubular-shaped terminal and said second tubular-shaped terminal.

21. The battery pack of claim 19, wherein said first tubular-shaped recess and said second tubular-shaped recess each have dust eliminating holes formed therein through said bottom portion of said battery casing.

22. A video camera device comprising:
   a video camera having a mounting portion; and
   a battery pack attachable to said mounting portion, said battery pack including:
      a battery casing for containing at least one secondary battery, said battery casing having a front side portion, a rear side portion, a bottom portion which is placed in contact with said mounting portion of said video camera, and a top portion having a surface which substantially corresponds in shape with the shape of said secondary battery, whereby a first void and a second void are formed respectively within said battery casing within spaces defined by said front side portion, said rear side portion, said bottom portion, said top portion, and sides of said at least one secondary battery;
      a first terminal coupled to the anode of said at least one secondary battery, said first terminal being located in said first void, said first terminal having a central axis which is disposed in a direction substantially parallel to the longitudinal direction of said at least one secondary battery; and
      a second terminal coupled to the cathode of said at least one secondary battery, said second terminal being located in said second void, said second terminal having a central axis which is disposed in a direction substantially parallel to the longitudinal direction of said at least one secondary battery.

23. The video camera device of claim 22, wherein said at least one secondary battery comprises two cylinder-shaped rechargeable batteries electrically coupled in series, said two cylinder-shaped rechargeable batteries being physically disposed parallel to one another in said battery casing.

24. The video camera device of claim 23, wherein said battery casing has a guide groove formed in said bottom portion which forms a recess in said battery casing between said two cylinder-shaped rechargeable batteries.

25. The video camera device of claim 24, wherein said battery pack attaches to said mounting portion of said video camera with said guide groove.

26. The video camera device of claim 25, wherein said battery casing has an insertion inhibiting groove formed in said top portion which forms a recess in said battery casing between said two cylinder-shaped rechargeable batteries.

27. The video camera device of claim 22, wherein said first terminal and said second terminal are tubular-shaped; and
   wherein said first tubular-shaped terminal is fixedly disposed in a first tubular-shaped recess of said battery casing in said first void and said second tubular-shaped terminal is fixedly disposed in a second tubular-shaped recess of said battery casing in said second void.

28. The video camera device of claim 27, wherein said video camera includes a first pin and a second pin for electrically coupling said video camera with said battery pack, said first pin and said second pin being inserted respectively into said first tubular-shaped terminal and said second tubular-shaped terminal.

29. The video camera of claim 27, wherein said first tubular-shaped recess and said second tubular-shaped recess each have dust eliminating holes formed therein through said bottom portion of said battery casing.

30. A device for connecting at least one battery with an external device comprising:
   a battery casing for containing said at least one battery, said battery casing having a front side portion, a rear side portion, a bottom portion which is placed in contact with said mounting portion of said external device, and a top portion having a surface which substantially corresponds in shape with the shape of said battery, whereby a first void and a second void are formed respectively within said battery casing within spaces defined by said front side portion, said rear side portion, said bottom portion, said top portion, and sides of said at least one battery;
   a first terminal coupled to the anode of said at least one battery, said first terminal being located in said first void, said first terminal having a central axis which is disposed in a direction substantially parallel to the longitudinal direction of said at least one battery; and
   a second terminal coupled to the cathode of said at least one battery, said second terminal being located in said second void, said second terminal having a central axis which is disposed in a direction substantially parallel to the longitudinal direction of said at least one battery.

31. The device of claim 30, wherein said first terminal and said second terminal are tubular-shaped; and
   wherein said first tubular-shaped terminal is fixedly disposed in a first tubular-shaped recess of said battery casing in said first void and said second tubular-shaped terminal is fixedly disposed in a second tubular-shaped recess of said battery casing in said second void.

32. The device of claim 31, wherein said external device includes a first pin and a second pin for electrically coupling said external device with said battery pack, said first pin and said second pin being inserted respectively into said first tubular-shaped terminal and said second tubular-shaped terminal.

33. The battery pack of claim 31, wherein said first tubular-shaped recess and said second tubular-shaped recess each have dust eliminating holes formed therein through said bottom portion of said battery casing.

* * * * *